Feb. 11, 1930.                J. HOROWITZ                    1,747,075
           MECHANISM FOR CUTTING AND FACILITATING
           THE REMOVAL OF MATERIAL FROM MACHINES
                   Filed Aug. 31, 1926            5 Sheets-Sheet 2
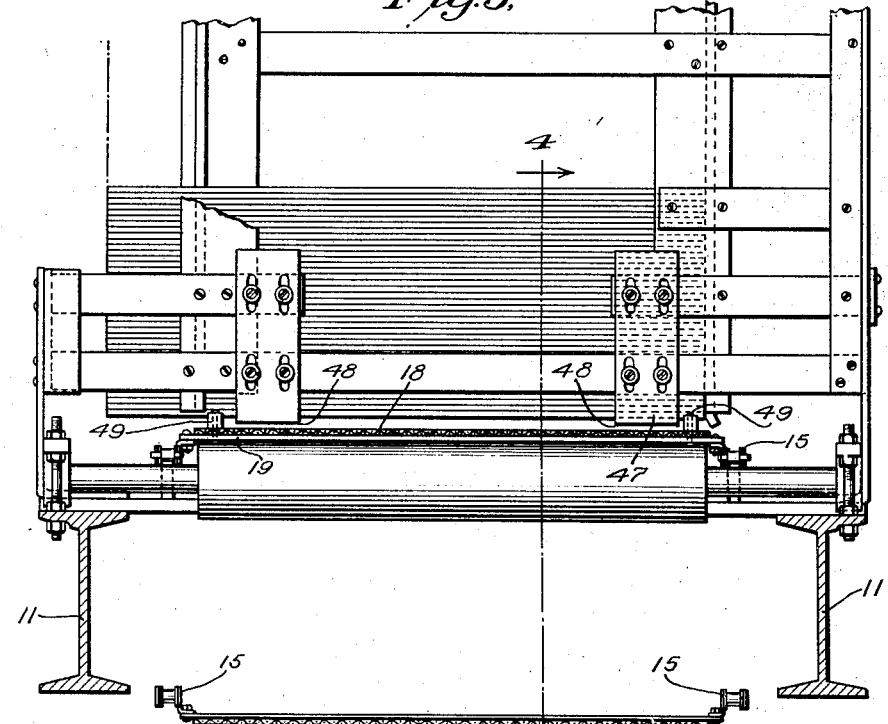
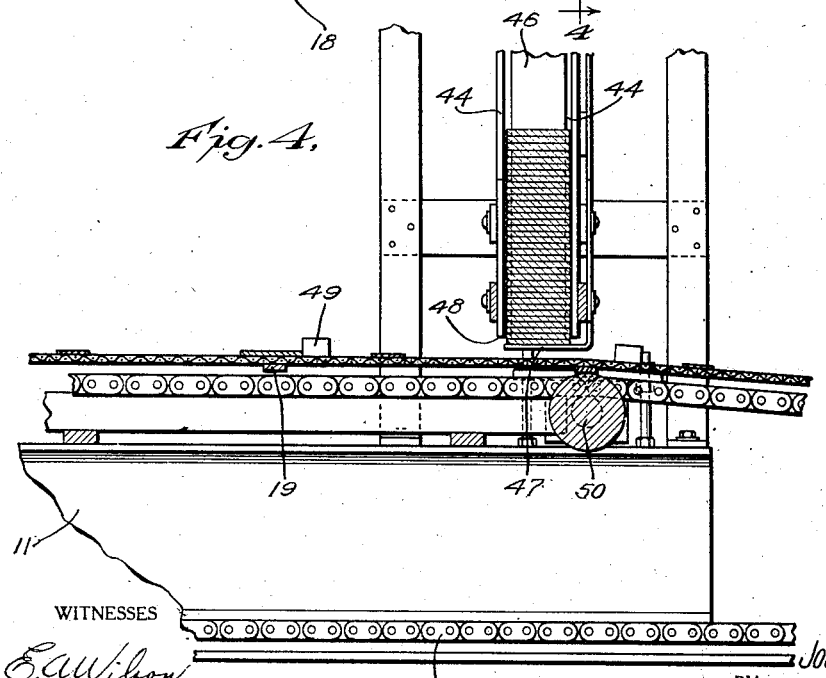
WITNESSES                                           INVENTOR
                                                    JOSEPH HOROWITZ
                                                BY
                                                    ATTORNEYS Feb. 11, 1930.  J. HOROWITZ  1,747,075
MECHANISM FOR CUTTING AND FACILITATING
THE REMOVAL OF MATERIAL FROM MACHINES
Filed Aug. 31, 1926   5 Sheets-Sheet 4
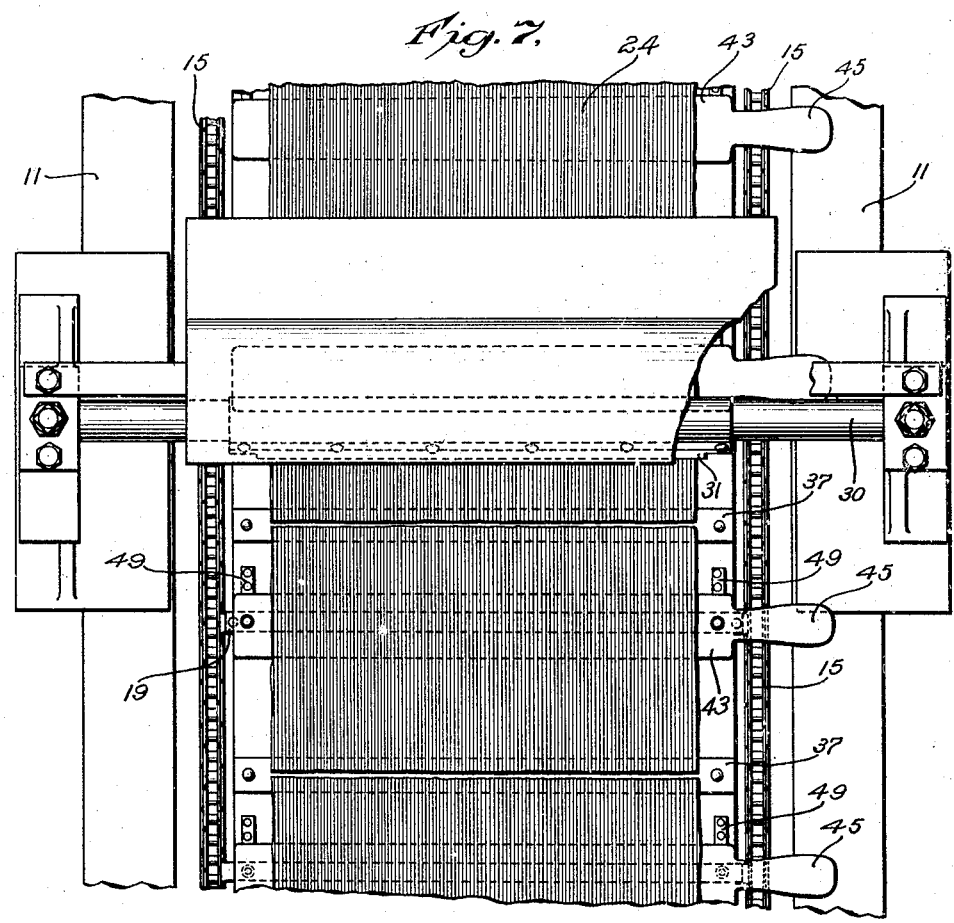
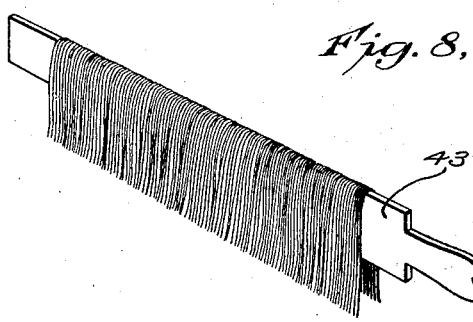
WITNESSES
INVENTOR
JOSEPH HOROWITZ
BY
ATTORNEYS Feb. 11, 1930.  J. HOROWITZ  1,747,075
MECHANISM FOR CUTTING AND FACILITATING
THE REMOVAL OF MATERIAL FROM MACHINES
Filed Aug. 31, 1926   5 Sheets-Sheet 5

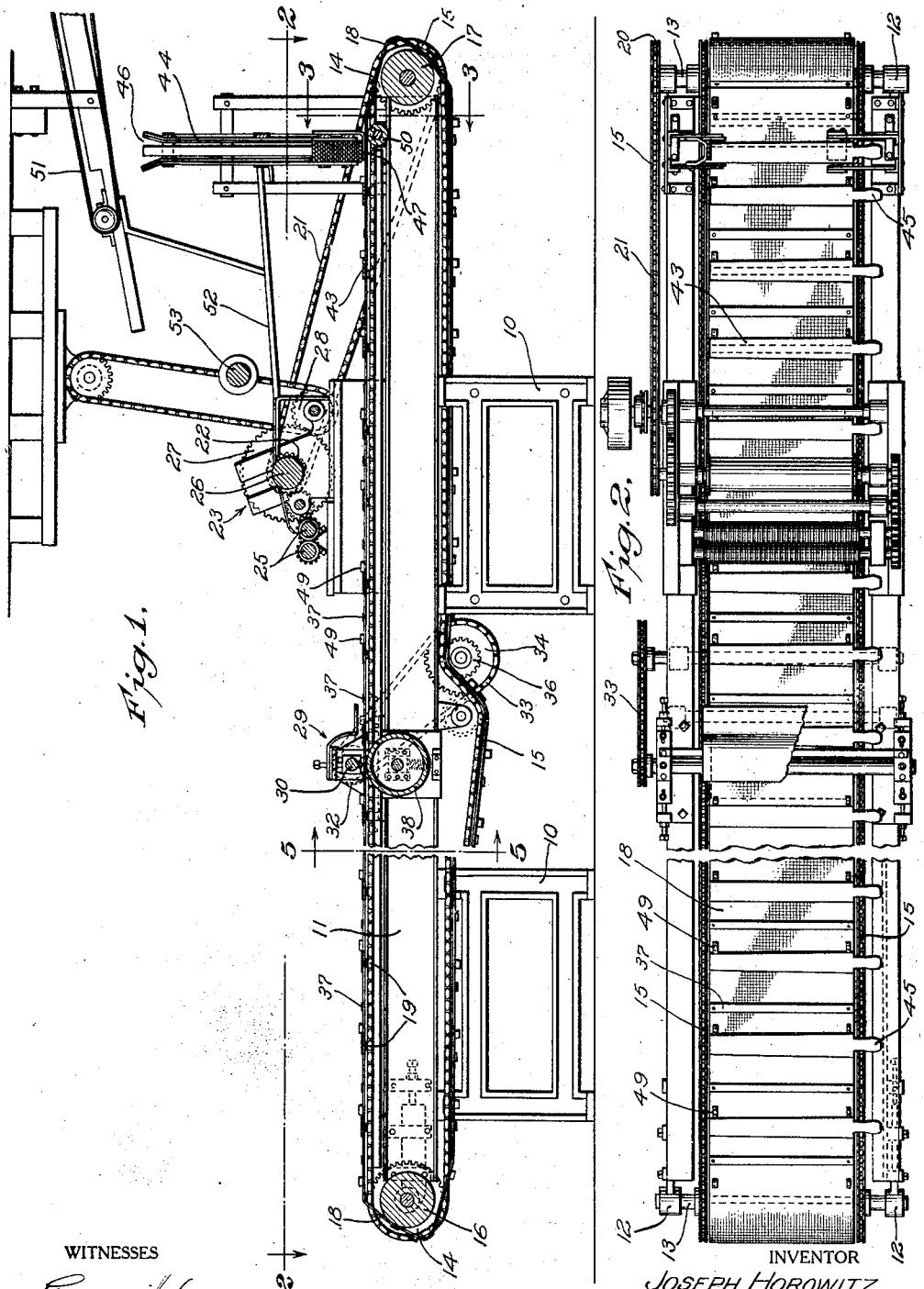

WITNESSES

INVENTOR
JOSEPH HOROWITZ
BY
ATTORNEYS

Patented Feb. 11, 1930

1,747,075

UNITED STATES PATENT OFFICE

JOSEPH HOROWITZ, OF NEW YORK, N. Y., ASSIGNOR TO HOROWITZ BROS. & MARGARETEN, OF NEW YORK, N. Y., A CORPORATION OF NEW YORK

MECHANISM FOR CUTTING AND FACILITATING THE REMOVAL OF MATERIAL FROM MACHINES

Application filed August 31, 1926. Serial No. 132,846.

This invention relates to mechanism for cutting noodles, macaroni, spaghetti, or the like, into uniform lengths, and has particular reference to the mechanism for feeding means in proper relation to the cut lengths whereby to facilitate the removal of the cut lengths from the machine.

The invention further comprehends a machine for manufacturing noodles, which insures the separation of the cut noodles into uniform quantities, so as to obviate the necessity of weighing the quantities thus cut as has heretofore been required.

Another object of the invention resides in the provision of means for removing the cut noodles or other articles from the machine expeditiously and without the necessity of physical contact therewith, whereby production is increased and sanitation is insured.

More specifically the invention comprehends in a machine of the character described, a continuously moving support upon which the noodles, macaroni, spaghetti, or other material, is fed, with means engaging the support at equidistantly spaced points for severing the noodles or other material into uniform lengths and with means for depositing on to the support prior to the feeding of the noodles or other material thereon, a plurality of peels or elements disposed transversely of the conveyor between the points at which the noodles or other materials are severed, to afford means for facilitating the lifting of the severed lengths from the support.

The invention furthermore contemplates a rotary severing element and means associated with the moving support for yieldably holding the same in contact with the severing element so as to insure the proper severing of the noodles or other material being operated upon by the machine.

The invention furthermore comprehends a machine of the character set forth which embodies the features of simplicity, construction and operation, economy of production and general efficiency.

With the above recited and other objects in view, reference is had to the following specification and accompanying drawing in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a longitudinal sectional view through the machine;

Fig. 2 is a plan view thereof;

Fig. 3 is a trasnverse sectional view taken approximately on the line 3—3 of Fig. 1 and illustrating the peel-feeding mechanism;

Fig. 4 is a fragmentary sectional view taken approximately on the line 4—4 of Fig. 3;

Fig. 7 is a fragmentary plan view of the machine adjacent the severing mechanism;

Fig. 8 is a perspective view illustrating the manner in which the cut material is lifted or removed by the peels from the machine;

Figure 5:
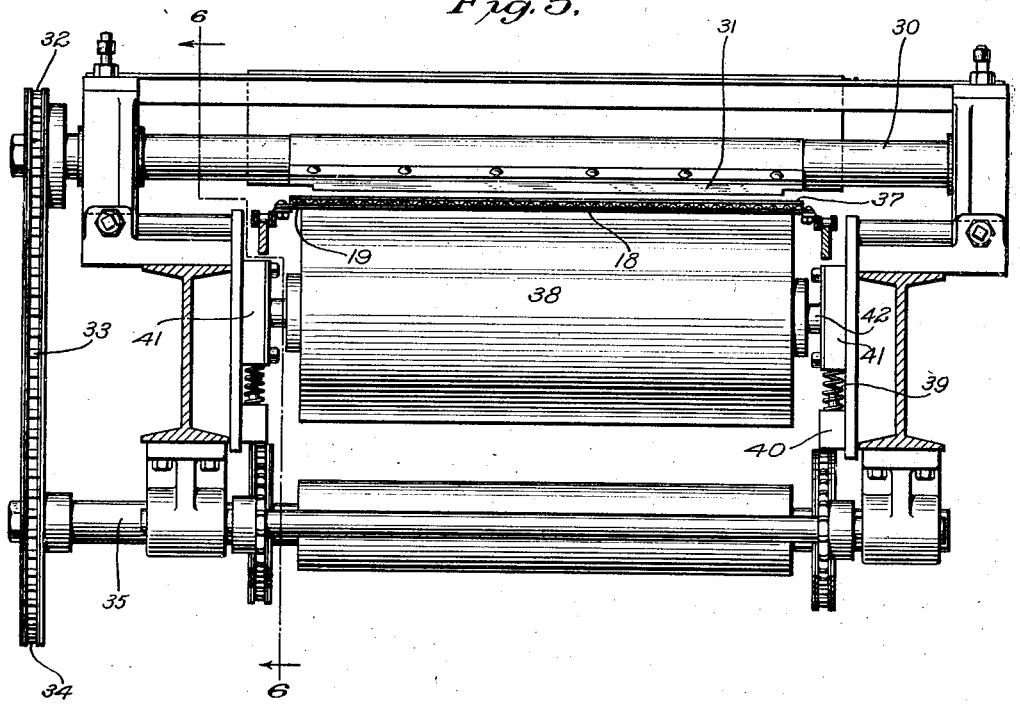
Fig. 5 is a transverse sectional view taken approximately on the line 5—5 of Fig. 1 and illustrating the severing mechanism.
Figure 6:
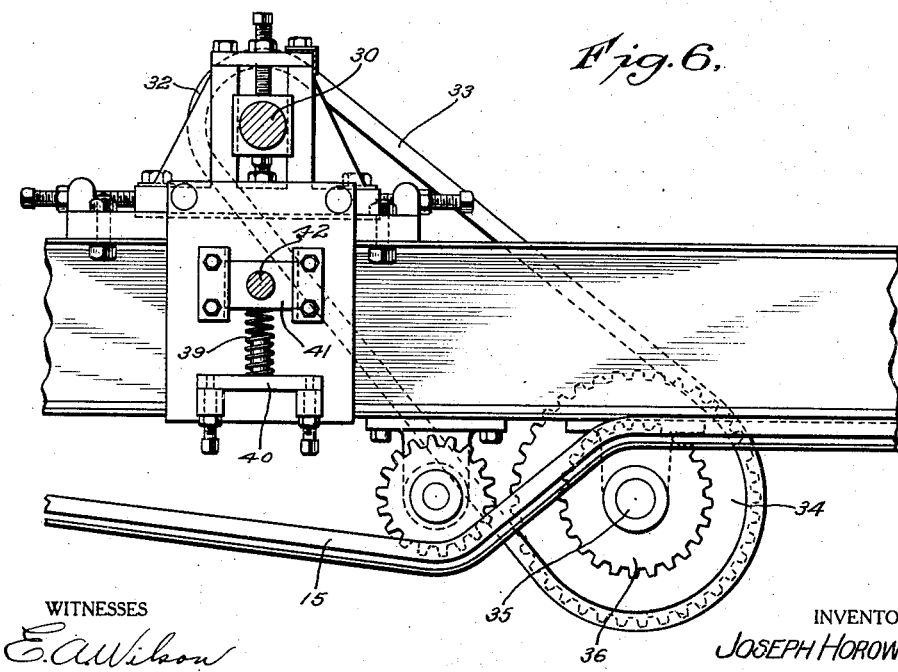
Fig. 6 is a sectional view taken approximately on the line 6—6 of Fig. 5.
Figure 9:
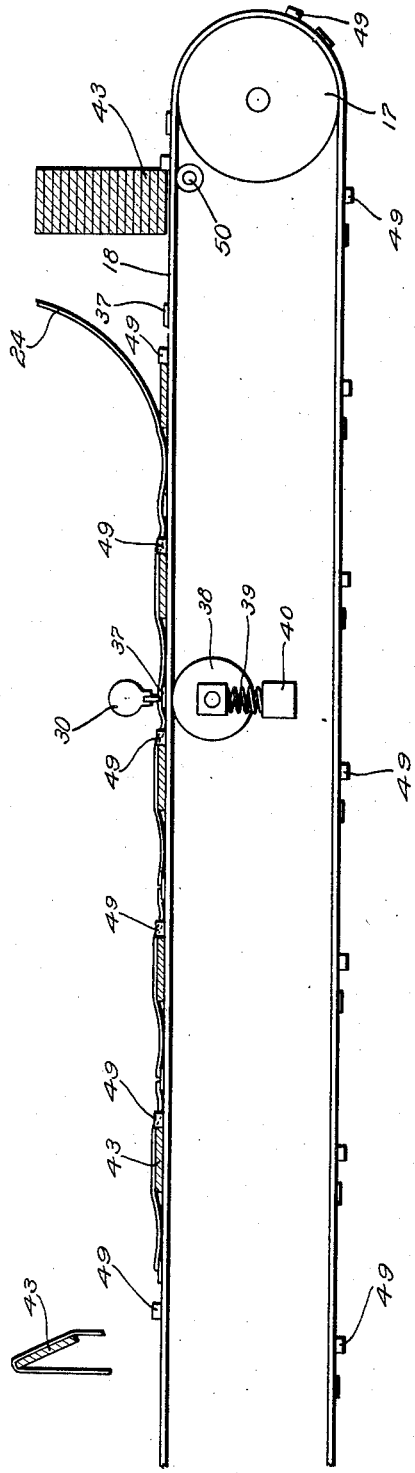
Fig. 9 is a diagrammatic view illustrating the operation of the machine.

Referring to the drawings by characters of reference, the machine which has been particularly designed and which is herein illustrated for the purpose of manufacturing noodles, includes supporting frames 10, which support longitudinally extending side rails 11, preferably in the nature of I-beams, which are laterally spaced from each other and which are provided at the opposite ends with suitable adjustable bearings 12 in which transverse shafts 13 are journaled for rotation. The shafts have keyed thereto at the opposite ends, laterally spaced pairs of sprocket wheels 14 around which sprocket chains 15 are trained. The shafts 13 also have keyed thereto between the sprockets, rollers 16 and 17, the former being hereinafter referred to as the front roller and the latter as the rear roller. A moving support which is in the nature of an endless conveyor belt 18 is connected at longitudinally spaced points to the sprocket chains by transverse strips 19 attached to the inner surface of the conveyor belt so that the belt is connected to the chain for movement therewith. The conveyor belt is adapted to move over the rollers 16 and 17 as guides. The shaft 13 for the rear roller is driven in a direction to move the upper lead of the conveyor belt 18 from the rear roller 17 toward the front roller by means of a sprocket 20 connected by a sprocket chain 21 to a driving sprocket 22.

Supported by the framework 10 and superposed with respect to the upper lead of the belt, is a dough-slicing mechanism 23 of any approved type for slicing a ribbon 24 of dough longitudinally. As illustrated, this type of slicing mechanism includes a pair of slicing rolls 25 between which the ribbon of dough is fed and from which the sliced ribbon is deposited onto the upper surface of the upper lead of the conveyor belt or moving support. The sprocket 22 around which is trained the sprocket chain 21 which drives the conveyor belt, is mounted on and keyed to the shaft 26 which drives the slicing mechanism 23 and which shaft has keyed thereto a gear 27 driven through a pinion 28 which in turn is connected with a suitable driving device or prime mover. This arrangement co-ordinates with the slicing mechanism 23 the movement of the conveyor belt in properly timed relation.

At a point spaced forwardly of the slicing mechanism 23, the machine is provided with a transverse cutting mechanism 29 which includes a rotary shaft 30 having a radially projecting cutting blade 31. The shaft 30 has keyed thereto a sprocket 32, which is connected by a sprocket chain 33 with a sprocket wheel 34. The sprocket wheel 34 is keyed to a countershaft 35, which countershaft has keyed thereto a pair of sprockets 36 over which the lower leads of the sprocket chains 15 are trained and with which the same mesh so that rotary motion is imparted to the shaft 30 from the sprocket chain to drive the knife blade 31. The ratio of the sprockets 32, 34 and 36 is such that the knife will engage with the upper surface of the upper lead of the conveyor belt or movable support at equidistantly spaced points during the travel of the belt under the same and it is obvious that the longitudinally slit ribbon will be transversely sub-divided or severed into uniform lengths so that a uniform quantity of noodles will be produced upon each engagement of the knife blade 31 with the conveyor belt.

In order to prevent wear or cutting of the conveyor belt by contact of the knife 31 therewith, the outer surface of the belt at the points of contact of the knife therewith, is provided with transverse metallic strips 37, it being understood that the conveyor belt is preferably of canvas or any other suitable flexible material. In order to insure a proper or intimate contact of the edge of the cutting knife with the wear plates or strips 37, a drum 38 is mounted under the conveyor belt immediately below the point at which the cutting knife contacts therewith, said drum being yieldably urged into contact with the under surface of the upper lead of the conveyor belt by coiled expansion springs 39, which are interposed between adjustable seats 40 and vertically slidable journal bearings 41 in which the opposite ends of the drum shaft 42 are mounted.

In order to speed up the production of a machine of this character, it is essential to provide means for facilitating the rapid removal of the cut sections of noodles after their passage beyond the transverse cutting mechanism. To this end, therefore, the invention further comprehends a means for feeding peels, paddles, or other elements 43 on to the upper face of the conveyor belt substantially medially of the points at which the longitudinally slit dough ribbon is severed transversely. To accomplish this, the peels or paddles are supported and arranged in stacked formation adjacent the rear end of the machine in a suitable hopper 44, which disposes the peels or paddles transversely of the conveyor belt, and directly thereover with the handles 45 of the peels projecting laterally beyond one side edge of the belt to be grasped by the operators distributed alongside the machine between the point at which the transverse cutting is done and the forward end of the machine, who remove the noodles therefrom. The hopper is provided with a flared upper end 46 to facilitate the introduction of the peels thereto and the same is formed at its lower end with vertically adjustable, transversely spaced supporting feet 47 upon which the lowermost peel is supported and to which position the peels are gravitationally fed. The lower end 48 of the forward side of the hopper is spaced above the supporting feed 47 a distance slightly greater than the thickness of the peels or paddles to permit the stripping or displacement of the lowermost peel or paddle, which stripping or displacement operation is accomplished by means of laterally spaced pairs of lugs 49 which project upwardly from the upper surface of the upper lead of the conveyor belt, with the upper ends of the lugs moving in a plane slightly above the lower surface of the lowermost peel and slightly below the upper surface thereof. In order to insure this proper relation of the lugs to the stack of peels or paddles, the belt immediately below the hopper is positively supported by a roller 50. The lugs 49 are arranged on the conveyor belt at a point between each of the points of transverse cutting of the noodles so as to position one of the peels or paddles intermediately thereof.

In use and operation of the machine, the ribbon of dough 24 is conveyed from any suitable point above the support by a conveyor element 51 where it descends on to a supporting platform 52, from which point the ribbon is trained over a guide spool 53 through the longitudinally slicing mechanism 23. The guide spool 53 is elevated above the platform 52 so that in event of excessive feeding of the ribbon, the slack will be disposed on the platform 52 while the slicing mechanism will remove the ribbon at a uniform rate from the platform to prevent clogging or overfeeding at the point of slicing between the slicing rollers 25. From the slicing rollers the sliced ribbon of dough will be deposited or fed on to the upper surface of the conveyor belt 18 over the transverse strips 37 and the peels or paddles 43. As the sliced ribbon is carried by the continuously moving support or conveyor element 18 under the transverse cutting mechanism 29, the knife blade 31 will sever the sliced ribbon at uniformly spaced points and into uniform lengths, which lengths overlie the transversely disposed peels or paddles. The operators standing alongside the machine between the transverse cutting mechanism and the forward end have only to grasp the handles 45 of the paddles or peels and to lift and remove the cut noodles thus formed in the manner illustrated in Fig. 8, and dispose the same on drying trays.

From the foregoing it will thus be seen that the speed of production is only limited to the speed with which the cut noodles may be removed from the conveyor belt, and, hence, by making the machine of great length between the cutting mechanism 29 and its forward end and employing a large number of operators for removing the peels, production may be materially increased over any other machine within the knowledge of the applicant.

While the machine has been described and illustrated particularly for the manufacture of noodles, it is obvious within the scope of the invention that the same may equally as well be employed for transversely cutting macaroni, spaghetti, or any analogous material by feeding the formed stock from an overhead supply on to the conveyor belt at the point at which the noodles are fed thereunto from the slicing mechanism 23.

What is claimed is:

1. A machine for manufacturing noodles, including a continuously moving conveyor element, mechanism disposed in superposed relation to the conveyor element for slicing a ribbon of dough longitudinally whereby to deposit the sliced ribbon on to the conveyor element, means engaging the conveyor element at equidistantly spaced points for severing the ribbon transversely into uniform lengths to complete the cutting of the noodles, mechanism for placing on to the conveyor element prior to the point at which the sliced ribbon is deposited, a plurality of peels disposed transversely of the conveyor between the points at which the ribbon is severed, to afford means for facilitating the lifting of the severed lengths from the support.

2. A machine for manufacturing noodles, including a continuously moving conveyor element, mechanism disposed in superposed relation to the conveyor element for slicing a ribbon of dough longitudinally whereby to deposit the sliced ribbon on to the conveyor element, means engaging the conveyor element at equidistantly spaced points for severing the ribbon transversely into uniform lengths to complete the cutting of the noodles, mechanism for placing on to the conveyor element prior to the point at which the sliced ribbon is deposited, a plurality of peels disposed transversely of the conveyor between the points at which the ribbon is severed, to afford means for facilitating the lifting of the severed lengths from the support, and said conveyor element having arranged thereon equidistantly spaced transverse wear plates with which the transverse severing means engages.

3. A machine for manufacturing noodles, including a continuously moving conveyor element, mechanism disposed in superposed relation to the conveyor element for slicing a ribbon of dough longitudinally whereby to deposit the sliced ribbon on to the conveyor element, means engaging the conveyor element at equidistantly spaced points for severing the ribbon transversely into uniform lengths to complete the cutting of the noodles, and mechanism for placing on to the conveyor element prior to the point at which the sliced ribbon is deposited, a plurality of peels disposed transversely of the conveyor between the points at which the ribbon is severed, to afford means for facilitating the lifting of the severed lengths from the support, the mechanism for placing the peels comprising a hopper arranged over the conveyor element and supporting a stack of peels, said peels having one end projecting out of the hopper and beyond one side of the conveyor element so as to be manually moved, vertically adjustable means at the lower end of the hopper for supporting the lowermost peel of the stack, and stripping lugs on the conveyor element engageable with the lowermost peel for stripping the same from the stack.

4. A machine for manufacturing noodles, including a continuously moving conveyor element, mechanism disposed in superposed relation to the conveyor element for slicing a ribbon of dough longitudinally whereby to deposit the sliced ribbon on to the conveyor element, means in advance of said slicing mechanism for receiving and preventing slack in the dough from reaching said slicing mechanism, means engaging the conveyor element at equidistantly spaced points for severing the ribbon transversely into uniform lengths to complete the cutting of the noodles, and mechanism for placing on to the conveyor element prior to the point at which the sliced ribbon is deposited, a plurality of peels disposed transversely of the conveyor between the points at which the ribbon is severed, to afford means for facilitating the lifting of the severed elements from the support.

5. A machine for manufacturing noodles and the like, comprising means for feeding a ribbon of dough, rotary cutters for cutting the ribbon of dough longitudinally into strips, an endless conveyor below the cutters and upon which the strips pass from the cutters, said conveyor being provided with transverse wear plates, a rotary cutter located above the conveyors and spaced from the cutters, which cut the dough into strips, for cutting the strips into lengths, means below the cutter which cuts the strips into lengths, for holding the wear plates of the conveyor in contact with the cutter, and means for placing a plurality of peels on the conveyor in front of the cutters which cut the dough into strips.

6. A machine for manufacturing noodles and the like, comprising a support, an endless conveyor mounted on the support, a platform above the conveyor, means for feeding the dough in the form of a ribbon onto the platform, a guide roller over which the ribbon of dough passes, a cutting mechanism to which the ribbon of dough passes from the guide roller for cutting the ribbon of dough into strips, a cutting mechanism above the conveyor in rear of the strip cutting mechanism, for cutting the strips into lengths, and means for placing peels on the conveyor in front of the cutters, which cut the ribbon of dough into strips.

JOSEPH HOROWITZ.